(12) United States Patent
Tanaka et al.

(10) Patent No.: US 11,613,324 B2
(45) Date of Patent: Mar. 28, 2023

(54) SADDLE RIDING VEHICLE

(71) Applicant: HONDA MOTOR CO., LTD., Tokyo (JP)

(72) Inventors: Takuro Tanaka, Tokyo (JP); Toru Sakai, Tokyo (JP); Kei Mayuzumi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 226 days.

(21) Appl. No.: 16/952,917

(22) Filed: Nov. 19, 2020

(65) Prior Publication Data

US 2021/0155311 A1 May 27, 2021

(30) Foreign Application Priority Data

Nov. 26, 2019 (JP) .............................. JP2019-213439

(51) Int. Cl.
| | |
|---|---|
| *B62J 50/21* | (2020.01) |
| *B62J 45/422* | (2020.01) |
| *B62K 11/14* | (2006.01) |
| *B62K 21/18* | (2006.01) |
| *B62J 17/00* | (2020.01) |
| *B60K 35/00* | (2006.01) |
| *B62K 19/32* | (2006.01) |
| *B62J 45/20* | (2020.01) |

(52) U.S. Cl.
CPC .............. *B62J 50/225* (2020.02); *B60K 35/00* (2013.01); *B62J 17/00* (2013.01); *B62J 45/422* (2020.02); *B62K 11/14* (2013.01); *B62K 21/18* (2013.01); *B62J 45/20* (2020.02); *B62K 19/32* (2013.01)

(58) Field of Classification Search
CPC ........ B62J 50/225; B62J 50/22; B62J 45/422; B62J 17/00; B62K 11/14
See application file for complete search history.

(56) References Cited

U.S. PATENT DOCUMENTS 4,687,072 A * 8/1987 Komuro ................. B62J 50/225
180/219
6,483,467 B2 * 11/2002 Kushida .................... H01Q 1/40
343/711

(Continued)

FOREIGN PATENT DOCUMENTS

| | | |
|---|---|---|
| EP | 2 824 022 A1 | 1/2015 |
| JP | 58-118464 | 7/1983 |

(Continued)

OTHER PUBLICATIONS

Japanese Office Action dated Aug. 31, 2021, English translation included, 9 pages.

(Continued)

*Primary Examiner* — Kevin Hurley
*Assistant Examiner* — Michael R Stabley
(74) *Attorney, Agent, or Firm* — Rankin, Hill & Clark LLP

(57) ABSTRACT

A saddle riding vehicle includes a steering handlebar, a pair of left and right handle posts that supports the handlebar, and a stay that supports an electric part. In the saddle riding vehicle, the stay is supported by the handle posts, the electric part includes a first electric part and a second electric part, and the second electric part is disposed at least at a position between the left and right handle posts in a vehicle front view.

10 Claims, 8 Drawing Sheets

(56) References Cited

U.S. PATENT DOCUMENTS

| | | | |
|---|---|---|---|
| 8,041,507 B2 | 10/2011 | Ieda et al. | |
| 10,661,850 B2 * | 5/2020 | Fukuyama | B62K 21/04 |
| 2007/0247377 A1 * | 10/2007 | Funayose | B62J 50/225 |
| | | | 343/711 |
| 2016/0288855 A1 | 10/2016 | Ueno | |

FOREIGN PATENT DOCUMENTS

| | | |
|---|---|---|
| JP | 2014-124973 | 7/2014 |
| JP | 2015-085749 | 5/2015 |
| JP | 2018-095139 | 6/2018 |

OTHER PUBLICATIONS

Indian Office Action dated Aug. 13, 2021, English translation included, 5 pages.
Indian Office Action dated Aug. 13, 2021 (included herewith), with English translation, 5 pages.

* cited by examiner

SADDLE RIDING VEHICLE

The present application claims priority under 35 U.S.C. § 119 to Japanese Patent Application No. 2019-213439 filed on Nov. 26, 2019. The content of the application is incorporated herein by reference in its entirety.

TECHNICAL FIELD

The present invention relates to a saddle riding vehicle.

BACKGROUND ART

Conventionally, in a saddle riding vehicle, there has been known a structure in which a stay for supporting a large electric part such as a meter is provided in the periphery of a steering handlebar and small electric parts such as connectors are attached to the stay (see, for example, Patent Document 1). In Patent Document 1, the small electric parts are provided on an outer side in the vehicle width direction relative to a headlight, so that the small electric parts are less likely to serve as an obstacle in relation to the layout of the headlight and the headlight can easily be disposed on the side of a vehicle body on the rear side.

PRIOR ART DOCUMENT

Patent Document

[Patent Document 1]
Japanese Patent Laid-Open No. Sho 58-118464

SUMMARY OF THE INVENTION

Problem to be Solved by the Invention

Incidentally, in the saddle riding vehicle, there is a trend toward an increase in the amount of electric parts mounted attendant on the electronization of the vehicle, and It is desired to dispose the electric parts compactly in the periphery of a handlebar.

The present invention has been made in consideration of the above-mentioned circumstances. It is an object of the present invention to permit electric parts to be disposed compactly in the periphery of a handlebar.

Means for Solving the Problem

A saddle riding vehicle includes a steering handlebar (27), a pair of left and right handle posts (28) that supports the handlebar (27), and a stay (70) that supports an electric part (60), in which the stay (70) is supported by the handle posts (28), the electric part (60) includes a first electric part (48) and a second electric part (61, 62, 63), and the second electric part (61, 62, 63) is disposed at least at a position between the left and right handle posts (23) in a vehicle front view.

In addition, in the abovementioned configuration, the first electric part (48) may be a large electric part, and the second electric part (61, 62, 63) may be a small electric, part smaller in size than the first electric part (48).

Besides, in the abovementioned configuration, the stay (70) may include a lower extension section (74) extending downward below the first electric part (48), the second electric parts (61, 62) may include a first small electric part (61) attached to a front surface side of the lower extension section (74) and a second small electric part (62) attached to a rear surface side of the lower, extension section (74), and the first small electric part (61) and the second small electric part (62) may overlap with each other in a vehicle front view and may be disposed between the left and right handle posts (28).

In addition, in the abovementioned configuration, the stay (70) may include a turning-back section (80) where a part of the lower extension section (74) turns back to a rear upper side, and the second small electric part (52) may be attached to the turning-back section (80).

Further, in the abovementioned configuration, the first electric part may be a meter (48), while the second electric part (61, 62, 63) may be a connector for harnesses, and the meter and the connector may be disposed such as to surround that portion (27a) of the handlebar (27) which is located between the left and right handle posts (28).

Besides, in the abovementioned configuration, the stay (70) may support a visor (49) covering the electric part (60) from & front side, and the visor (49) may be smaller in width than a headlight (44) in a vehicle front view.

In addition, in the abovementioned configuration, a visor (49) that covers the electric part (60) from a front side may be provided, and the stay (70) may include a pair of left and right handle post fastening sections (71) fastened to the left and right handle posts (28), an upper-side stay section (72) that extends rearward on an upper side of the handlebar (27) from the handle post fastening sections (71) and that supports the first electric part (48), a visor support section (73) that extends forward relative to the upper-side stay section (72) and that supports the visor (49), and a lower extension section (74) that extends downward relative to the upper-side stay section (72), that is located on a front side of the handlebar (27), and that supports the second electric part (61, 62, 63).

Besides, in the abovementioned configuration, the stay (70) may include an antenna support member (75) that supports an antenna (84) for radiocommunication.

In addition, in the abovementioned configuration, a visor (49) that covers the electric part (60) from a front side may be provided, the stay (70) may include a pair of left and right handle post fastening sections (71) fastened to the left and right handle posts (28), a visor support section (73) that extends forward relative to the handle post fastening sections (71) and that supports the visor (45), and an antenna support member (75) that supports an antenna (84) for radiocommunication, and the antenna support member (75) may be supported by the visor support section (73).

Besides, in the abovementioned configuration, at least a part of the second small electric; part (62) may be disposed at a position between front surfaces (23b) and rear surfaces (28c) of the left and right handle posts (28) In a vehicle longitudinal direction.

In addition, in the abovementioned configuration, the handle post (28) may include a base section (51) and a cap section (52) that clamps the handlebar (27) between itself and the base section (51), and the handle post fastening section (71) may be fastened to the cap section (52).

Further, in the abovementioned configuration, the cap section (52) may include a stay support section (52a) extending toward an inner side in the vehicle width direction relative to the handle post (28), and the handle post fastening section (71) may be fastened to the stay support section (52a).

Effect of the Invention

The saddle riding vehicle includes the steering handlebar, the pair of left and right handle posts that supports the handlebar, and the stay that supports the electric part, the stay is supported by the handle posts, the electric part includes the first electric part and the second electric part, and the second electric part is disposed at least at a position between the left and right handle posts in a vehicle front view.

According to this configuration, the second electric part can be disposed at a position between the left and right handle posts by utilizing the stay that is supported by the handle posts and that supports the first electric; part. Therefore, the electric parts can be disposed compactly in the periphery of the handlebar.

In addition, in the abovementioned configuration, the first electric part may be a large electric part, while the second electric part may be a small electric part smaller in size than the first electric part.

According to this configuration, the small electric parts can be disposed at positions between the left and right handle posts by utilizing the stay that supports the large electric part.

Besides, in the abovementioned configuration, the stay may include the lower extension section extending downward below the first electric part, the second electric parts way include the first small electric part attached to the front surface side of the lower extension section and the second small electric part attached to the rear surface side of the lower extension section, the first small electric part and the second small electric part may overlap with each other in a vehicle front view and may be disposed at positions between the left and right handle posts.

According to this configuration, the first small electric part and the second small electric part can be disposed compactly between the left and right handle posts by utilizing a space on the front and rear sides of the lower extension section extending downward below the large electric part.

In addition, in the abovementioned configuration, the stay may include the turning-back section where a part of the lower extension section turns back toward a rear upper side, and the second small electric part may be attached to the turning-back section.

According to this configuration, the second small electric part can be attached to the lower extension section with a simple structure through the turning-back section.

Further, in the abovementioned configuration, the first electric part may be the meter, the second electric part may be the connector for the harnesses, and the meter and the connector may be disposed such as to surround that portion of the handlebar which is located between the left and right handle posts.

According to this configuration, the meter and the connector can be disposed compactly in the periphery of that portion of the handlebar which is located between the left and right handle posts.

Besides, in the abovementioned configuration, the stay may support the visor covering the electric part from the front side, and the visor may be smaller in width than the headlight in a vehicle front view.

According to this configuration, the visor can be supported by utilizing the stay for the electric part, and the electric part can be protected from the front side by the visor which is smaller in width than the headlight.

In addition, in the abovementioned configuration, the visor which covers the electric part from the front side may be provided, and the stay may include the pair of left and right handle post fastening sections fastened to the left and right handle posts, the upper-side stay section that extends rearward on an upper side of the handlebar from the handle post fastening section and that supports the first electric part, the visor support section that extends forward relative to the upper-side stay section and that supports the visor, and the lower extension section that extends downward relative to the upper-side stay section, that is located on the front side of the handlebar, and that supports the second electric part.

According to this configuration, the first electric part can be supported on an upper side of the handlebar through the upper-side stay section, and the visor can be supported on the front side of the upper-side stay section by the visor support section. Besides, the second electric part can be supported on a lower side of the first electric part by the lower extension section located on a lower side of the upper-side stay section and on the front side of the handlebar.

In addition, in the abovementioned configuration, the stay may include the antenna support member that supports the antenna for radiocommunication.

According to this configuration, the antenna for radiocommunication can be supported by the stay for the electric parts through the antenna support member.

Besides, in the abovementioned configuration, the visor which covers the electric parts from the front side may be provided, the stay may include the pair of left and right handle post fastening sections fastened to the left and right handle posts, the visor support section that extends forward relative to the handle post fastening sections and that supports the visor, and the antenna support member that, supports the antenna for radiocommunication, and the antenna support member may be supported by the visor support section.

According to this configuration, the antenna support member can be supported with a simple structure by utilizing the visor support section that extends forward relative to the handle post fastening sections.

In addition, in the abovementioned configuration, at least a part of the second small electric part may be disposed between the front surfaces and the rear surfaces of the left and right handle posts in a vehicle longitudinal direction.

According to this configuration, the second small electric part can be disposed compactly by utilizing the space between the front surfaces and the rear surfaces of the handle posts between the left and right handle posts.

Besides, in the abovementioned configuration, the handle post may include the base section and the cap section that clamps the handlebar between itself and the base section, and the handle post fastening section may be fastened to the cap section.

According to this configuration, the stay can be attached to and detached from the handle posts together with the cap section.

Further, in the abovementioned configuration, the cap section may include the stay support section extending toward an inner side in the vehicle width direction relative to the handle post, and the handle post fastening section may be fastened to the stay support section.

According to this configuration, the stay can be compactly fastened to the handle posts by utilizing the space on the inner side in the vehicle width direction of the handle posts.

MODE FOR CARRYING OUT THE INVENTION

Figure 1:
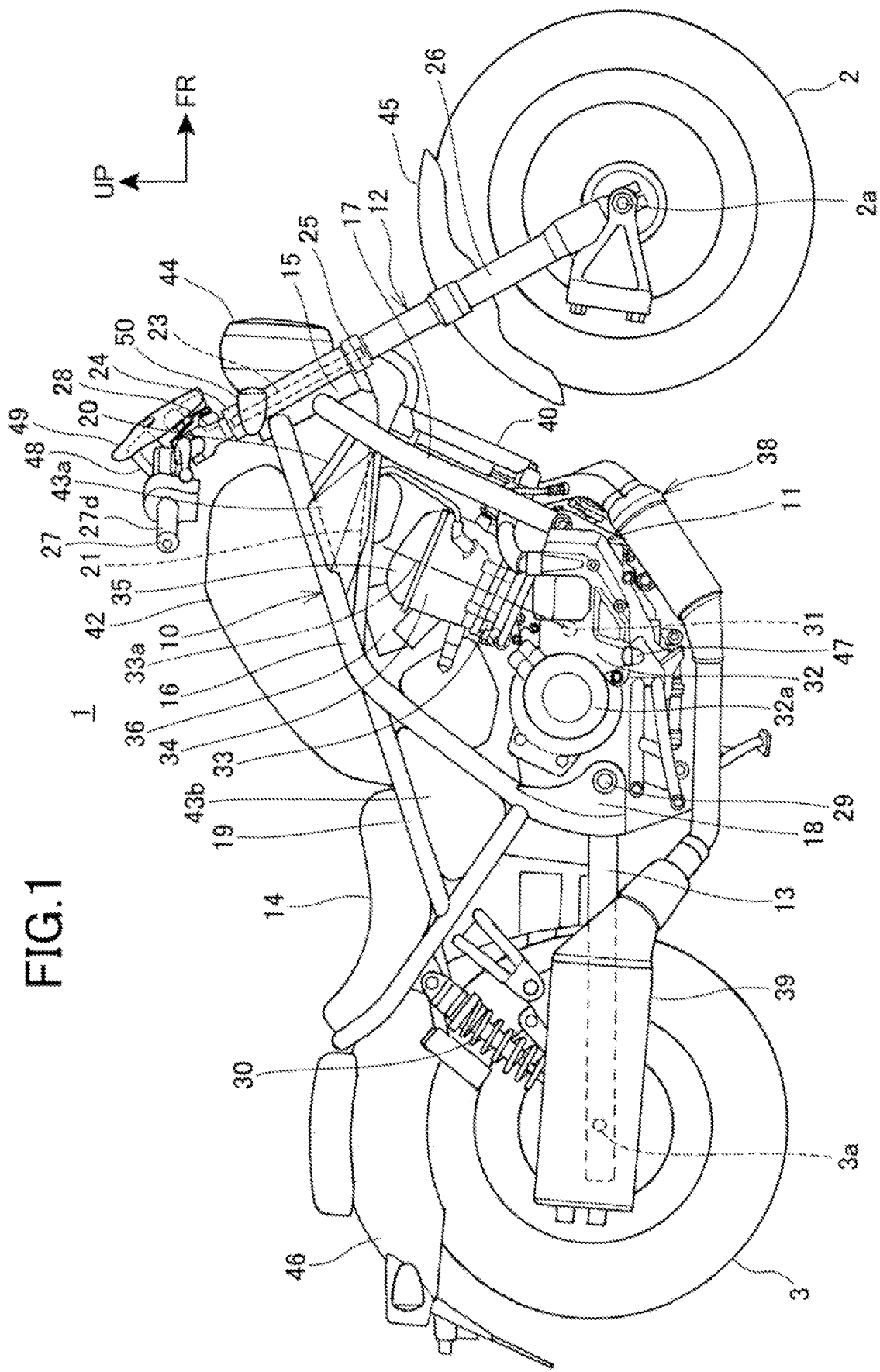
FIG. 1 is a right-side view of a two-wheeled motor vehicle according to an embodiment of the present invention.

An embodiment of the present invention will be described below referring to the drawings. Note that, in the description, the directions such as forward and rearward directions, leftward and rightward directions, and upward and downward directions are the same as those with reference to the vehicle body, unless specified otherwise. In addition, in each drawing, symbol FR indicates the vehicle body front side, symbol UP indicates the vehicle body upper side, and symbol LH indicates the vehicle body left-hand side.

FIG. 1 is a right-side view of a two-wheeled motor vehicle 1 according to an embodiment of the present invention.

The two-wheeled motor vehicle 1 is a vehicle in which an engine 11 as a power unit is supported on a body frame 10, a front fork 12 supporting a front wheel 2 in a steerable manner is steerably supported on a front end of the body frame 10, and a swing arm 13 supporting a rear wheel 3 is provided on a rear portion side of the body frame 10.

The two-wheeled motor vehicle 1 is a saddle riding vehicle in which a rider is seated astride a seat 14, which is provided on an upper side of a rear portion of the body frame 10.

The body frame 10 includes a head pipe 15 provided at a front end of the body frame 10; a pair of left and right main frames 16 extending rearwardly downward from the head pipe 15; a pair of left and right down frames 17 extending rearwardly downward from a lower side of the main frames 16 at the head pipe 15; a pair of left and right pivot frames 18 extending downward from rear ends of the main frames 16; and seat frames 19 extending rearward from rear portions of the main frames 16 and upper portions of the pivot frames 18.

In addition, the body frame 10 includes a pair of left and right first reinforcement frames 20 that connects upper portions of the down frames 17 and upper portions of the main frames 16; and a pair of left and right second reinforcement frames 21 that connects upper portions of the down frames 17 and the main frames 16 under the first reinforcement frames 20.

The front fork 12 Includes a steering shaft 23 rotatably shaft-supported by the head pipe 15; a top bridge 24 fixed to an upper end of the steering shaft 23; a bottom bridge 25 fixed to a lower end of the steering shaft 23; and a pair of left and right fork tubes 25 supported by the top bridge 24 and the bottom bridge 25. The fork tube 26 is a telescopic type suspension.

The top bridge 24 extends in the vehicle width direction from the steering shaft 23 on an upper side of the head pipe 15 and connects upper end portions of the left and right fork tubes 26.

The bottom bridge 25 extends in the vehicle width direction from the steering shaft 23 on a lower side of the head pipe 15 and connects the left and right fork tubes 26.

The fork tubes 26 are disposed in the state of being inclined rearwardly in a vehicle side view. The front wheel 2 is shaft-supported on an axle 2a bridgingly arranged between lower end portions of the left and right fork tubes 26.

A handlebar 27 for the rider to steer the front fork 12 to the left and right is attached to the top bridge 24 through handle posts 28.

The swing arm 13 is shaft-supported by a pivot shaft 29 supported by the left and right pivot frames 18. The pivot, shaft 29 extends horizontally in the vehicle width direction. The swing arm 13 has a front-end portion shaft-supported by the pivot shaft 29 and is swung up and down with the pivot shaft 29 as a center.

The rear wheel 3 is shaft-supported on an axle 3a provided at a rear end portion of the swing arm 13.

The two-wheeled motor vehicle 1 includes a pair of left and right rear suspensions 30 bridgingly arranged between a rear end portion of the swing arm 13 and the seat frames 19.

The engine 11 is disposed between the down frames 17 and the pivot frames 18 in the vehicle longitudinal direction on a lower side of the main frames 16 and is fixed to the body frame 10.

The engine 11 includes a crankcase 32 supporting a crankshaft 31 extending horizontally in the vehicle width direction (left-right direction); a cylinder 33 provided at an upper portion of a front portion of the crankcase 32; a cylinder head 34 connected to an upper surface of the cylinder 33; and a head cover 35 attached to an upper surface of the cylinder cover 34. A cylinder axis 33a of the cylinder 33 is inclined forwardly relative to the vertical direction.

An intake device 36 of the engine 11 is connected to an intake port at a rear surface of the cylinder head 34.

An exhaust device of the engine 11 includes an exhaust pipe 38 connected to an exhaust port at a front surface of the cylinder head 34; and a muffler 39 connected to a downstream end of the exhaust pipe 33.

A rear portion of the crankcase 32 is a transmission case section 32a accommodating a transmission. An output power of the engine is transmitted to the rear wheel 3 by a drive chain (not illustrated) connecting an output shaft of the transmission and the rear wheel 3.

A radiator 40 through which cooling water for the engine 11 passes is disposed on a lower side of the head pipe 15 and on the front side of the engine 11.

A fuel tank 42 is disposed between the head pipe 15 and the seat 14 on an upper side of the main frames 16.

A body cover of the two-wheeled motor vehicle 1 includes front-side side covers 43a covering spaces between the first reinforcement frames 20 and the second reinforcement frames 21; and rear-side side covers 43b covering spaces between the seat frames 19 and the main frames 16.

A headlight 44 is provided on the front side of the head pipe 15.

A front fender 45 covering the front wheel 2 from above is supported by the fork tubes 26.

The rear wheel 3 is covered from above by a rear fender 46 disposed on the rear side of the seat 14.

A pair of left and right steps 47 on which the rider on the seat 14 puts his or her feet is disposed on the front side of the left and right pivot frames 18.

A meter 43 (first electric part, large electric part) for displaying information concerning the two-wheeled motor vehicle 1 such as vehicle velocity is disposed on an upper side of the handlebar 27. The two-wheeled motor vehicle 1 includes a visor 49 covering the meter 48 and the like from the front side.

A pair of left and right winkers 50 is attached to upper portions of the front fork 12.

Figure 2:
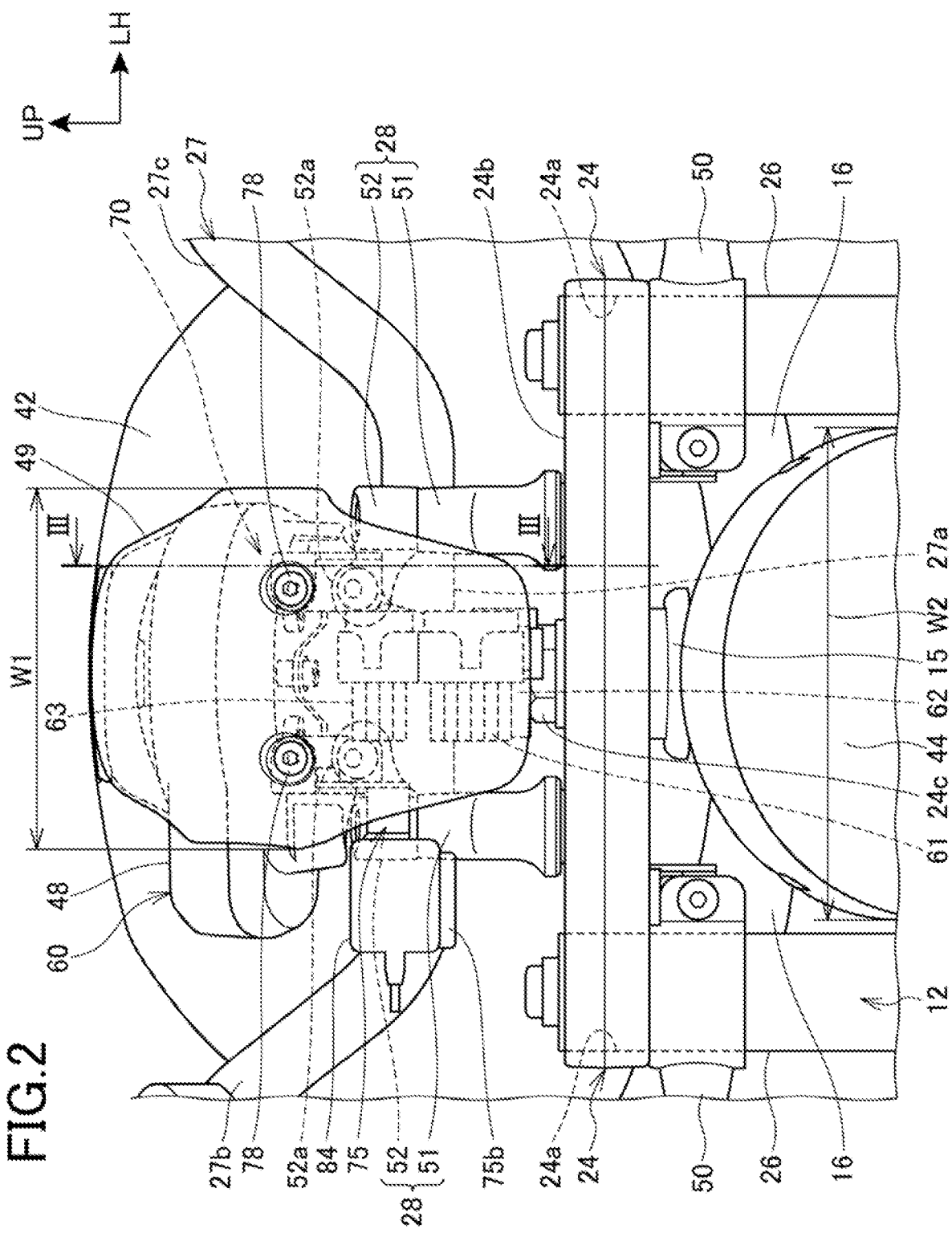
FIG. 2 is a view, from a front side, of a peripheral part of a handlebar in a direction substantially orthogonal to fork tubes in a vehicle side view.
Figure 3:
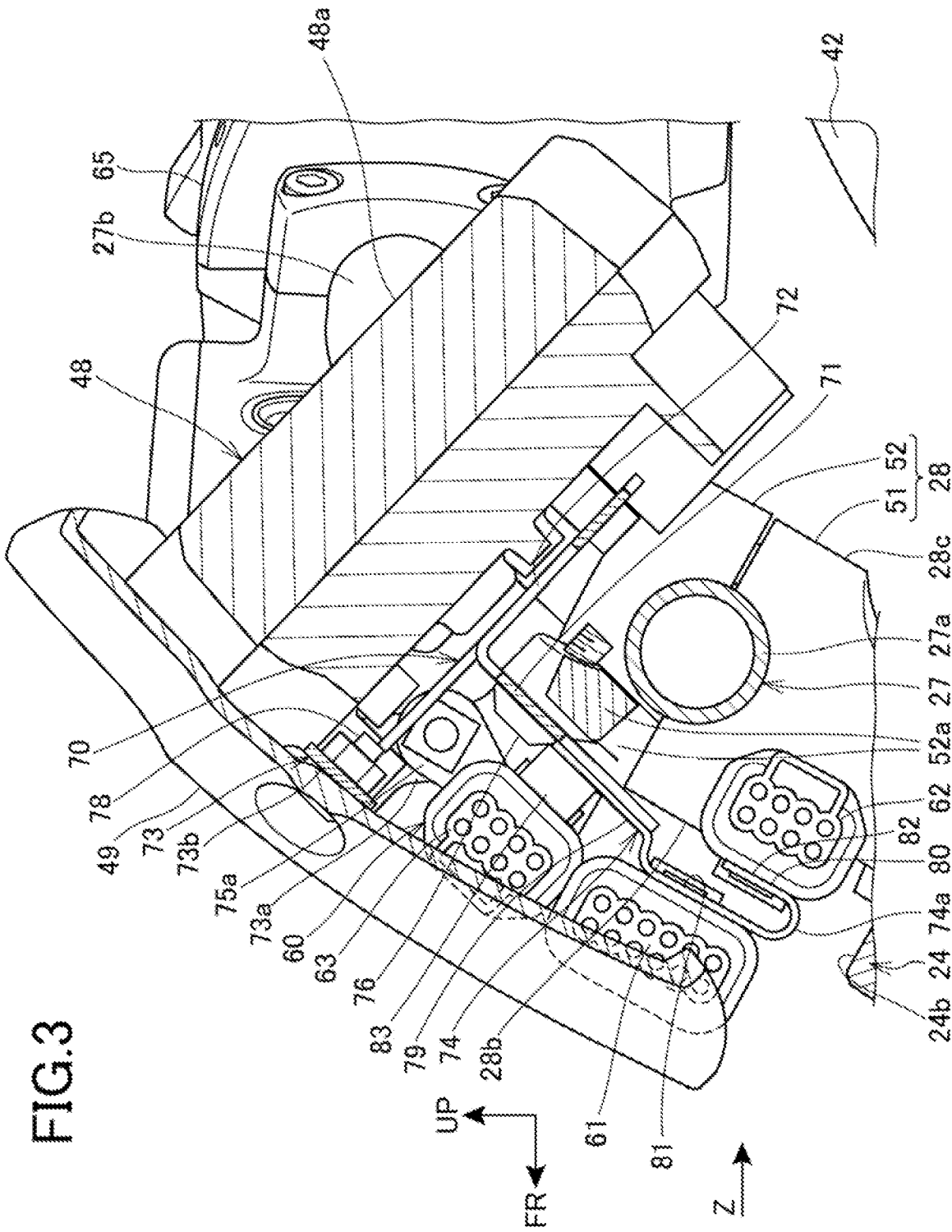
FIG. 3 is a sectional view taken along line III-III of FIG. 2.
Figure 4:
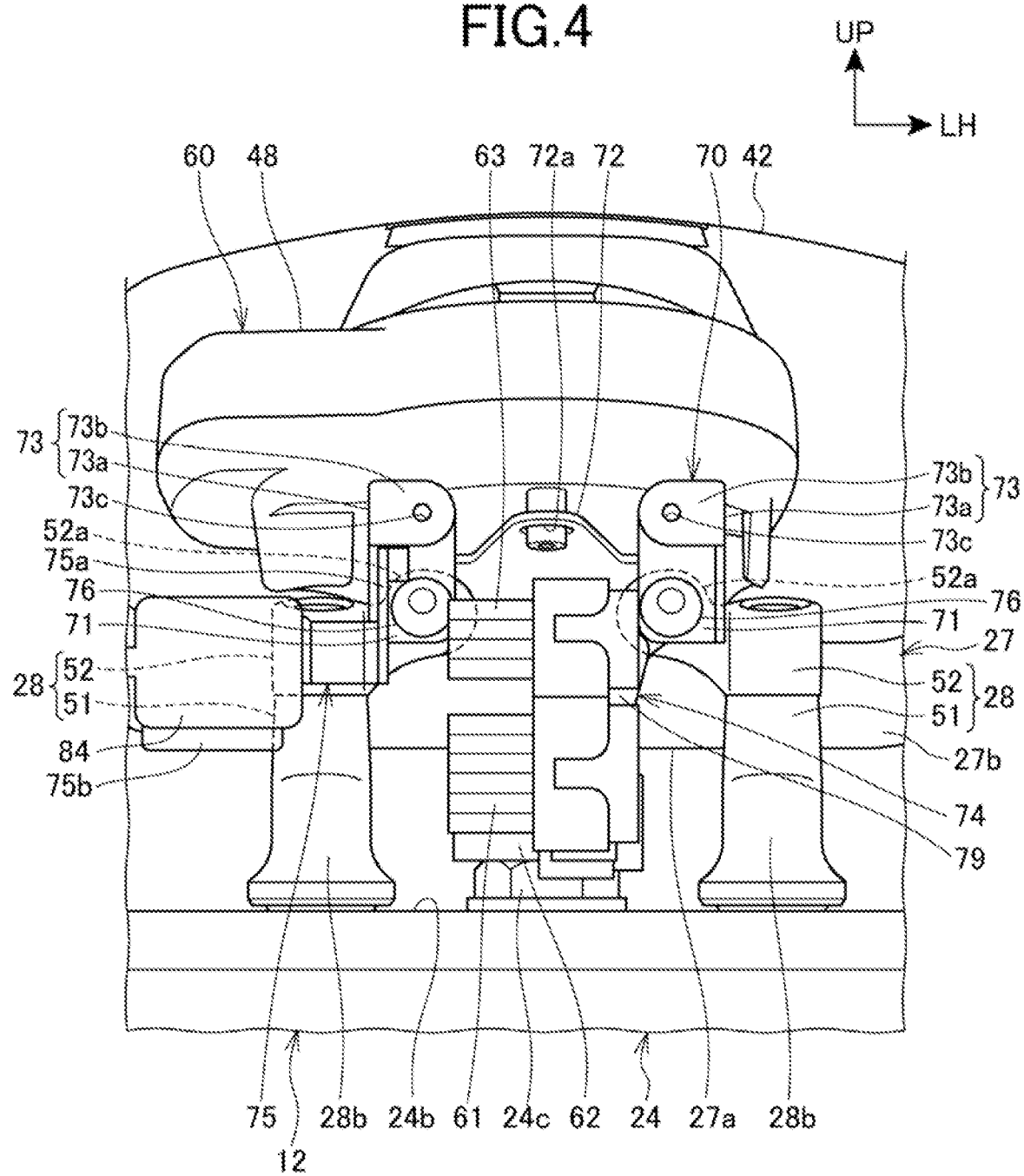
FIG. 4 is a diagram depicting a state in which a visor is detached in FIG. 2.

FIG. 2 is a view, from the front side, of a peripheral part of the handlebar 27 in a direction substantially orthogonal to the fork tubes 26 in a vehicle side view. FIG. 3 is a sectional view taken along line III-III of FIG. 2. FIG. 4 is a diagram depicting a state in which the visor 49 is detached in FIG. 2.

Referring to FIGS. 2 to 4, the top bridge 24 is a plate-shaped member extending in the vehicle width direction (left-right direction) and is provided at both end portions in the vehicle width direction with fork support holes 24a to which upper end portions of the fork tubes 26 are fitted.

The top bridge 24 is fastened to an upper end portion of the steering shaft 23 (FIG. 1) through a stem nut 24c provided at the center in the vehicle width direction of an upper surface 24b of the top bridge 24.

The headlight 44 is disposed between the left and right fork tubes 26 and between the top bridge 24 and the bottom bridge 25 (FIG. 1). The left and right winkers 50 are attached to the lower side of the top bridge 24 at upper end portions of the fork tubes 26.

A pair of left and right handle posts 23 is provided at the upper surface 24b of the top bridge 24. The left and right handle posts 28 are spaced from each other in the vehicle width direction.

Specifically, the handle posts 28 are disposed respectively between the fork support hole 24a on one of the left and right sides and the stem nut 24c and between the fork support, hole 24a on the other of the left and eight sides and the stem nut 24c.

The handle posts 28 are fixed by being fastened to the top bridge 24 and extend upward from the upper surface 24b. Since the upper surface 24b of the top bridge 24 is inclined rearward relative to the horizontal in a vehicle side view, the handle posts 23 extend obliquely toward a rear upper side. Front surfaces 28b of the handle posts 28 are inclined rearward in a vehicle side view.

The handle post 28 includes a base section 51 fixed to the upper surface 24b of the top bridge 24; and a cap section 52 fastened to an upper surface of the base section 51. In addition, the handle post 28 includes a stay support section 52a extending toward an inner side in the vehicle width direction from an inside surface in the vehicle width direction of each cap section 52.

The handle-car 27 is a pipe handlebar integrally including a central portion 27a extending rectilinearly between the left and right handle posts 28 and a pair of left and right handlebar sections 27b and 27c extending toward outer sides in the vehicle width direction and upward from both ends of the central portion 27a. Grip members 27d (FIG. 2) to be gripped by the rider are provided at the handlebar sections 27b, 27c.

The handlebar 27 is supported on the handle posts 28 by clamping both end portions of the central portion 27a between an upper surface section of the base section 51 and the cap section 52. The central portion 27a of the handlebar 27 extends in the vehicle width direction at a position spaced upward from the upper surface 24b of the top bridge 24. The central portion 27a is that portion of the handlebar 27 which is located between the left and right handle posts 28.

The two-wheeled motor vehicle 1 includes a stay 70 for supporting an electric part 60, in the periphery of the handlebar 27.

The stay 70 is supported by the left and right handle posts 28.

The electric part 60 includes the meter 48 as a large electric part. In addition, the electric part 60 includes a first small electric part 61, a second small electric part 62, and a third small electric part 63 as small electric parts smaller in size than the meter 45. The first small electric part 61, the second small electric part 62, and the third small electric part 63 are second electric parts different in sire and kind from the meter 48 which is a first electric part.

Figure 5:
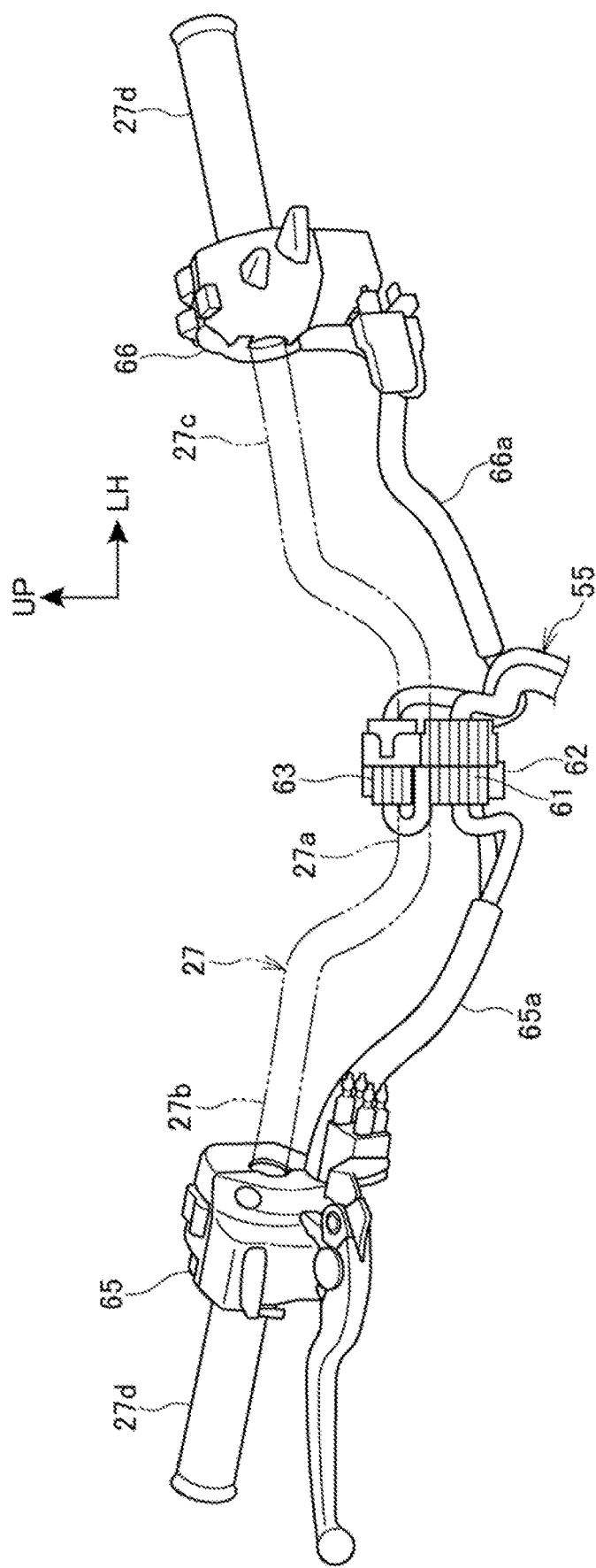
FIG. 5 is a view, from a front side, of a layout of parts concerning electric equipment in the periphery of the handlebar.

FIG. 5 is a view, from the front side, of the layout of parts concerning electric equipment in the periphery of the handlebar 27.

The handlebar section 27b on one of the left and right sides is provided with a one-side operation section 65 for operating an electric system and the like of the two-wheeled motor vehicle 1, whereas the handlebar section 27c on the other of the left and right sides is provided with an other-side operation section 66 for operating an electric system and the like of the two-wheeled motor vehicle 1. The one-side operation section 65 and the other-side operation section 66 are operation sections for operating, for example, lights of the two-wheeled motor vehicle 1, an operation mode of the engine 11, a horn, a throttle of an intake system, the meter 48 and the like.

A harness 65a extending toward an inner side in the vehicle width direction from the one-side operation section 65 is connected to a harness 55 on a power source side of the two-wheeled motor vehicle 1 through the first small electric part 61 and the second small electric part 62.

In other words, the first small electric part 61 and the second small electric part 62 are connectors for connecting the harness 65a and the harness 55.

Specifically, the harness 65a is branched and connected to each of the side surfaces on one side in the vehicle width direction of the first small electric part 61 and the second small electric part 62, whereas the harness 55 is connected to each of the side surfaces on the other side in the vehicle width direction of the first small electric part 61 and the second small electric part 62.

A harness 66a extending toward an inner side in the vehicle width direction from the other-side operation section 66 is connected to the harness 55 on the power source side through the third small electric part 63.

In other words, the third small electric part 63 is a connector for connecting the harness 66a and the harness 55.

Specifically, the harness 66a is connected to a side surface on one side in the vehicle width direction of the third small electric part 63, while the harness 55 is connected to a side surface on the other side in the vehicle width direction of the third small electric part 63.

Note that the harness 65a, the harness 66a, and the harness 55 are not illustrated in FIGS. 2 to 4.

Figure 6:
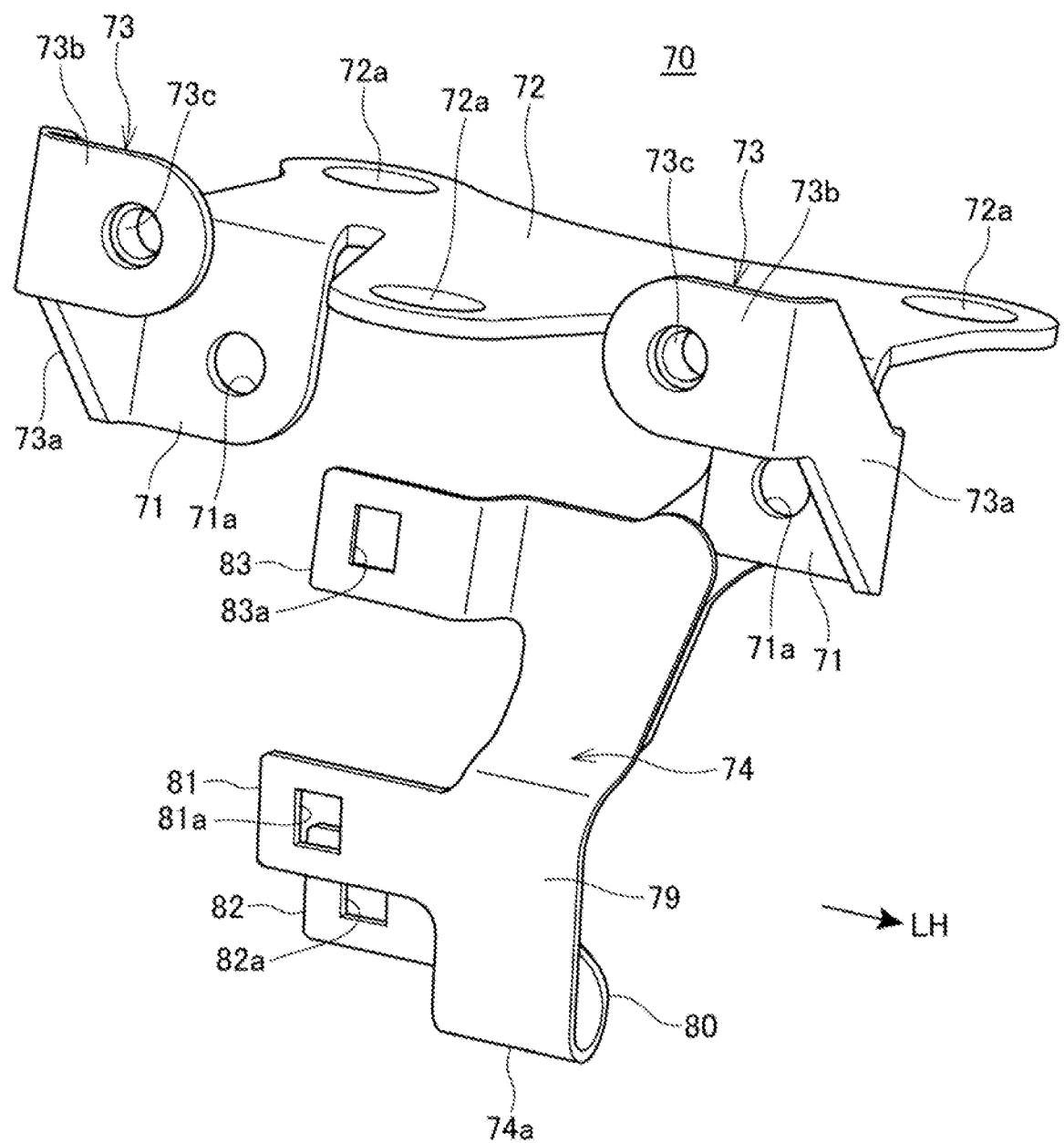
FIG. 6 is a perspective view of a stay as viewed from a front side.
Figure 7:
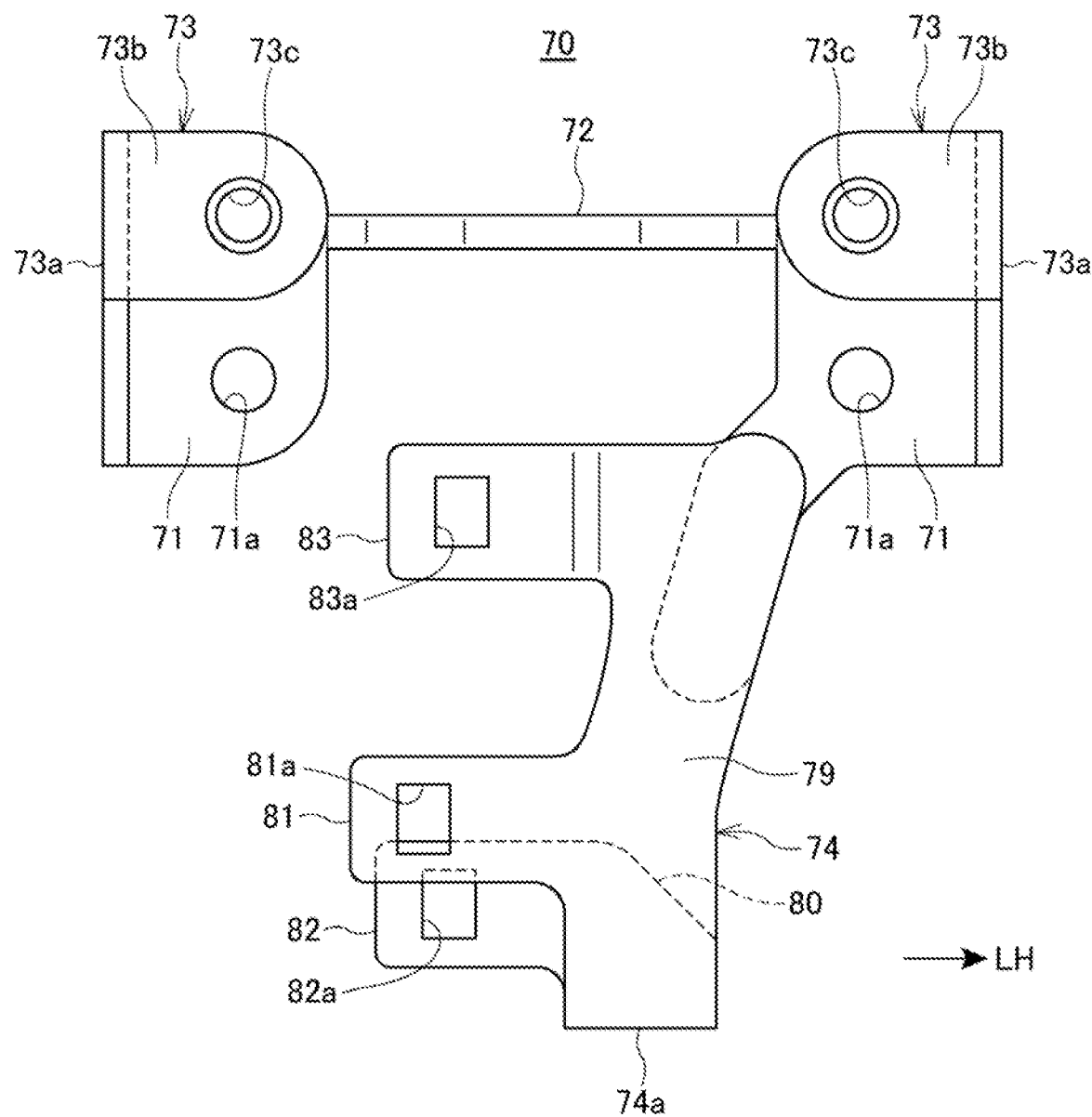
FIG. 7 is a front view of the stay as viewed from a front side.
Figure 8:
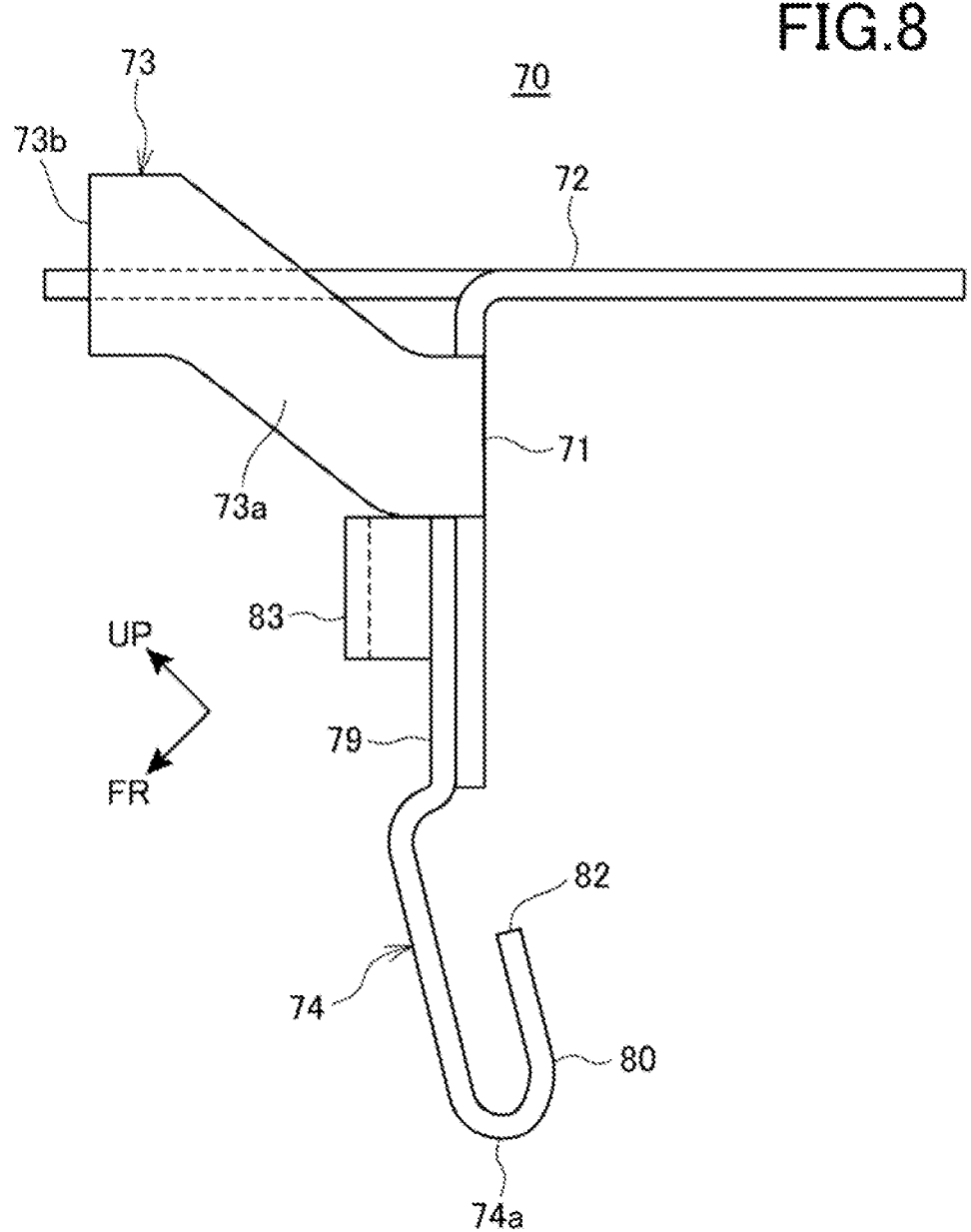
FIG. 8 is a side view of the stay as viewed from a lateral side of the vehicle.

FIG. 6 is a perspective view of the stay 70 as viewed from a front side. FIG. 7 is a front view of the stay 70 as viewed from the front side. FIG. 8 is a side view of the stay 70 as viewed from a vehicle lateral side.

Referring to FIGS. 3, 4, and 6 to 6, the stay 70 integrally includes a pair of left and right handle post fastening sections 71 fastened to the stay support sections 52a of the left and right handle posts 23; an upper-side stay section 72 supporting the meter 43; a pair of left and right visor support sections 73 supporting the visor 49; and a lower extension section 74 supporting the first small electric part 61, the second small electric part 62, and the third small electric part 63. The stay 70 is located between the left and right handle posts 26 and on an upper side of the upper surface 24b of the top bridge 24, in a vehicle front view.

In addition, as depicted in FIGS. 2, 3, and 4, an antenna support member 75 extending toward an outer side in the vehicle width direction relative to the handle post fastening section 71 is attached to the stay 70.

The left and right handle post fastening sections 71 of the stay 70 are plate-shaped sections making contact with front surfaces of the stay support sections 52a of the handle posts 25. The stay 70 is fastened to the stay support sections 52a of the handle posts 28 by a pair of stay fasteners 76 respectively inserted in and passed through fixing holes 71a of the left and right handle post fastening sections 71 from a front side. The handle post fastening sections 71 are located on an upper side of the central portion 27a of the handlebar 27.

The upper-side stay section 72 of the stay 70 is a plate-shaped section that extends rearward from upper ends of the left and right handle post fastening sections 71 and that connects the left and right handle post fastening sections 71 in the vehicle width direction.

The upper-side stay section 72 extends rearward, specifically, rearwardly downward on an upper side of the central portion 27a of the handlebar 27, in a vehicle side view.

The meter 43 is attached to an upper surface of the upper-side stay section 72, and a display surface 48a of the meter 43 is inclined rearwardly downward such as to face the rider on the rear upper side. The upper-side stay section 73 is provided with a plurality of meter fixing holes 72a in and through which fixtures (not illustrated) for fastening the meter 48 to the upper-side stay section 72 are inserted and passed.

The left and right visor support sections 73 of the stay 70 are arm-shaped plate sections each extending forward from outside edge portions in the vehicle width direction of the left and right handle post fastening sections 71.

Specifically, the visor support section 73 includes a front extension section 73a extending forward from the handle post fastening section 71; and an inside extension section 73b extending toward an inner side in the vehicle width direction from a front end portion of the front extension section 73a. The inside extension section 73b is provided with a visor fixing hole 73c to which a visor fastener 78 (FIG. 2) is fastened. The inside extension section 73b is located on the front side relative to the handle posts 28 and the upper-side stay section 72.

The visor 43 is fixed to the left and right inside extension sections 73b by the pair of visor fasteners 78 inserted in and passed through the visor 49 and the visor fixing holes 73c from the front side. The visor 49 is inclined rearward in a vehicle side view, such as to be along the front surfaces 28b of the handle posts 28 and a front surface of the meter 48.

The lower extension section 74 of the stay 70 is a plate-shaped section extending downward from a lower portion of the handle post fastening section 71 on one of the left and right sides and is located below the upper-side stay section 72. The lower extension section 74 extends downward on a front side of the central portion 27a of the handlebar 27. A lower end portion 74a of the lower extension section 74 is located directly above a front portion of the upper surface 24b of the top bridge 24. The lower extension section 74 is disposed with its plate thickness direction directed in the vehicle longitudinal direction.

Specifically, the lower extension section 74 includes a plate-shaped extension section 79 extending obliquely forwardly downward from the handle post fastening section 71; a turning-back section 80 where the extension section 79 is turned back in a U shape rearwardly upward in a vehicle side view at a lower end portion 74a of the lower extension section 74; a first support section 81 extending toward an inner side in the vehicle width direction from a lower portion of the extension section 75; a second support section 32 where an upper portion of the turning-back section 80 extends toward an inner side in the vehicle width direction; and a third support section 83 extending toward an inner side in the vehicle width direction from an upper portion of the extension section 79.

The second support section 82 is located on a rear lower side of the first support section 81. The third support section 83 is located on a rear upper side of the first support section 81.

The first support section 81 is provided with an engaging hole 81a. The second support section 82 is provided with an engaging hole 82a. The third support section 83 is provided with an engaging hole 83a.

Referring to FIGS. 2 to 4, the antenna support member 75 includes an attachment section 75a extending downward from the front extension section 73a of the visor support section 73 on one of the left and right sides; and a support section 75b extending toward an outer side in the vehicle width direction from the attachment section 75a. The attachment section 75a is attached to the front extension section 73a located on the side opposite to the side where the lower extension section 74 is provided in the left-right direction. The support section 75b is located on the front side and on an outer side in the vehicle width direction relative to the handle post 28.

An antenna 84 for radiocommunication is attached to an upper surface of the support section 75b of the antenna support member 75. The antenna 84 is, for example, an antenna of on-vehicle equipment in an automatic toll collection system on a toll road.

The first small electric part 61 is supported by the first support section 81 of the stay 70. The first small electric part 61 is attached to a front surface of the first support section 81 by engagement of its rear surface portion with the engaging hole 81a.

The second small electric part 62 is supported by the second support section 82 of the stay 70. The second small electric part 62 is attached to a rear, surface of the second support section 82 by engagement of its front surface portion with the engaging hole 62a.

The third small electric part 63 is supported by the third support section 83 of the stay 70. The third small electric part 63 is attached to a front surface of the third support section 83 by engagement of its rear surface portion with the engaging hole 33a.

The first small electric part 61 is a connector of a larger size than the second small electric part 62 provided on the rear side of the turning-back section 80. For example, the number of terminals of the first small electric part 61 is 12 pins, while the number of terminals of the second small electric part 62 is eight pins, so that the number of terminals of the first small electric part 61 is larger than the number of terminals of the second small electric part 62. Since the second small electric part 62 of a size smaller than the first small electric part 61 is thus provided on the rear side of the turning-back section 80, the connector can be disposed even on the rear side of the turning-back section 80.

In addition, the third small electric part 63 is a connector of a size smaller than the first small electric part 61. For example, the number of terminals of the third small electric part 63 is eight pins, so that the number of terminals of the third small electric part 63 is smaller than the number of terminals of the first small electric part 61.

The visor 49 is disposed on the front side of the left and right; handle posts 28 and covers the meter 48, the stay 70, the central portion 27a of the handlebar 27, the first small electric part 61, the second small electric part 62, and the third small electric part 63 from the front side.

The first small electric part 61, the second small electric part 62, and the third small electric part 63 are supported by the stay 70 supported by the handle posts 28 and located between the left and right handle posts 28, thereby being disposed between the left and right handle posts 28 and on an upper side of the upper surface 24b of the top bridge 24. Therefore, the first small electric part 61, the second small electric part 62, and the third small electric part 63 can be disposed compactly, by utilizing a space on an upper side of the upper surface 24b of the top bridge 24 and between the left and right handle posts 28.

In addition, the first small electric part 61, the second small electric part 62, and the third small electric part 63 are disposed on the rear side of the visor 49 and on the front side of the central portion 27a of the handlebar 27. Therefore, the first small electric part 61, the second small electric part 62, and the third small electric part 63 can be disposed compactly, by utilizing a space between the visor 49 and the central portion 27a of the handlebar 27.

The first small electric part 61 is disposed in front of the central portion 27a of the handlebar 27, and its lower portion overlaps with the central portion 27a in a vehicle front view (view along an arrow Z in FIG. 3).

The second small electric part 62 is disposed on a rear lower side of the first small electric part 61. The second small electric part 62 is disposed in front of the central portion 27a of the handlebar 27, and its upper portion overlaps with the central portion 27a in a vehicle front view.

In a vehicle front view, the first small electric part 61 overlaps, from the front side, with the second small electric part 62 located on the rear side. Therefore, the first small electric part 61 and the second small electric part 62 can be disposed compactly.

The third small electric part 63 is disposed on a front upper side of the central portion 27a of the handlebar 27, the first small electric part 61 is disposed in front of the central portion 27a, and the second small electric part 62 is disposed on a front lower side of the central portion 27a. In addition, the meter 43 is disposed on an upper side of the central portion 27a of the handlebar 27.

In other words, the central portion 27a of the handlebar 27 is surrounded by the first small electric part 61, the second small electric part 62, and the third small electric part 63 from the front side and is surrounded by the meter 48 from the upper side. Therefore, the first small electric part 61, the second small electric part 62, the third small electric part 63, and the meter 48 can be disposed compactly, by utilizing a space in the periphery of the central portion 27a of the handlebar 27.

In addition, the second small electric part 62 has at least a part thereof disposed between the front surfaces 28b of the handle posts 28 and the rear surfaces 28c (FIG. 3) of the handle posts 28. Therefore, the second small electric part 62 can be disposed compactly, by utilizing a space between the front surfaces 28b and the rear surfaces 28c between the left and right handle posts 28.

Further, the second small electric part 62 has at least a part thereof disposed between the front surfaces 28b of the handle posts 28 and the central portion 27a of the handlebar 27. Therefore, the second small electric part 62 can be disposed compactly, by utilizing a space between the front surfaces 28b and the central portion 27a of the handlebar 27 between the left and right handle posts 28. The second small electric part 62 is disposed on the front side relative to the stem nut 24c (FIG. 2).

The second support section 82 supporting the second small electric part 62 is provided at the turning-back section 80 where a plate-shaped section of the lower extension section 94 is turned back rearward. Therefore, the second support section 82 can easily be formed at such a position as not to be liable to be an obstacle for the first support section 81 which supports the first small electric part 61.

Referring to FIG. 2, the width W1 of the visor 49 in the vehicle width direction is smaller than the width W2 of the headlight 44 in the vehicle width direction. In addition, the width W1 of the visor 49 in the vehicle width direction is substantially the same as the total width of the left and right handle posts 28 in the vehicle width direction. Therefore, the meter 43, the first small electric part 61, the second small electric part 62, and the third small electric part 63 can be protected from the frontside by the visor 49 smaller in width than the headlight 44. Besides, since the width W1 of the visor 49 is small and a front-end portion of the two-wheeled motor vehicle 1 looks simple, the two-wheeled motor vehicle 1 has a good external appearance.

In the vertical direction, the visor 49 extends rearwardly upward from a position on an upper side of the upper surface 24b of the Lop bridge 24 to a position on an upper side of an upper end of the meter 48.

The antenna 84 supported by the antenna support member 75 is located on an outer side in the vehicle width direction relative to the visor 49. Therefore, the antenna 84 can receive radio waves well.

As has been described above, according to the embodiment of the present invention, the two-wheeled motor vehicle 1 includes the steering handlebar 27, the pair of left and right handle posts 28 supporting the handlebar 27, and the stay 70 supporting the electric part 60; the stay 70 is supported by the handle posts 28; the electric part 60 includes the meter 48 as the first electric part and the first small electric part 61, the second small electric part 62, and the third small electric part 63 as second electric parts; and the first small electric part 61, the second small electric part 62, and the third small electric part 63 are disposed at positions between the left and right handle posts 23 in a vehicle front view.

According to this configuration, the first small electric part 61, the second small electric part 62, and the third small electric part 63 can be disposed at positions between the left and right handle posts 28, by utilizing the stay 70 that is supported by the handle posts 28 and that supports the meter 48. Therefore, the electric part 60 can be disposed compactly in the periphery of the handlebar 27.

In addition, the meter 48 is the large electric part, while the first small electric part 61, the second small electric part 62, and the third small electric part 63 are the small electric parts smaller in size than the meter 48.

According to this configuration, the first small electric part 61, the second small electric part 62, and the third small electric part 63 can be disposed at positions between the left and right handle posts 28, by utilizing the stay 70 that supports the meter 48.

Besides, the stay 70 includes the lower extension section 74 extending downward below the meter 48; the second electric parts include the first small electric part 61 attached to a front surface side of the lower extension section 74 and the second small electric part 62 attached to a rear surface side of the lower extension section 74; and the first small electric part 61 and the second small electric part 62 overlap with each other in a vehicle front view and are disposed at positions between the left and right handle posts 28.

According to this configuration, the first small electric part 61 and the second small electric part 62 can be disposed compactly between the left and right handle posts 26, by utilizing a space on the front and rear sides of the lower extension section 74 extending downward below the meter 48.

In addition, the stay 70 includes the turning-back section 80 where a part of the lower extension section 74 is turned back rearwardly upward, and the second small electric; part 62 is attached to the turning-back section 80.

According to this configuration, the second small electric part 62 can be attached to the lower extension section 74 with a simple structure through the turning-back section 80.

Further, the first electric part is the meter 43, the first small electric part 61 is the connector for the harness 65*a* and the harness 55, the second small electric part 62 is the connector for the harness 65*a* and the harness 55, the third small electric part 63 is the connector for the harness 66*a* and the harness 55, and the reefer 43, the first small electric part 61, the second small electric part 62, and the third small electric part 63 are disposed such as to surround the central portion 27*a* of the handlebar 27 which is a portion located between the left and right handle posts 23.

According to this configuration, the meter 48, the first small electric part 61, the second small electric part 62, and the third small electric part 63 can be disposed compactly in the periphery of the central portion 27*a* of the handlebar 27.

In addition, the stay 70 supports the visor 49 covering the electric part 60 from the front side, and the visor 49 is smaller in width than the headlight 44 in a vehicle front view.

According to this configuration, the visor 49 can be supported by utilizing the stay 70 for the electric part 60, and the electric part 60 can be protected from the front side by the visor 49 which is smaller in width than the headlight 44.

Besides, the visor 49 covering the electric part 60 from the front side is provided, and the stay 70 includes the pair of left and right handle post fastening sections 71 fastened to the left and right handle posts 26; the upper-side stay section 72 that extends rearward on an upper side of the handlebar 27 from the handle post fastening sections 71 and that supports the meter 46; the visor support section 73 that extends forward relative to the upper-side stay section 72 and that supports the visor 49; and the lower extension section 74 that extends downward relative to the upper-side stay section 72, that is located on the front side of the handlebar 27, and that supports the first small electric part 61, the second small electric part 62, and the third small electric part 63.

According to this configuration, the meter 48 can be supported on an upper side of the handlebar 27 through the upper-side stay section 72, and the visor 49 can be supported on the front side of the upper-side stay section 72 by the visor support section 73. In addition, the first small electric part 61, the second small electric part 62, and the third small electric part 63 can be supported on a lower side of the meter 43 by the lower extension section 74 which is located on a lower side of the upper-side stay section 72 and on the front side of the handlebar 27.

Besides, the stay 70 includes the antenna support member 75 that supports the antenna 84 for radiccommunication.

According to this configuration, the antenna 84 for radio-communication can be supported by the stay 70 for the electric part 60 through the antenna support member 75.

Note that the antenna support member 75 may be provided integrally with the stay 70, or the antenna support member 75 provided as a body separate from the stay 70 may be fixed to the stay 70 by fastening or the like.

In addition, the visor 49 covering the electric part 60 from the front side is provided, the stay 70 includes the pair of left and right handle post fastening sections 71 fastened to the left and right handle posts 28; the visor support section 73 extending forward relative to the handle post fastening sections 71 and supporting the visor 49; and the antenna support member 75 supporting the antenna 84 for radiocommunication, and the antenna support member 75 is supported by the visor support section 73.

According to this configuration, the antenna support member 75 can be supported with a simple structure by utilizing the visor support section 73 extending forward relative to the handle post fastening sections 71.

Besides, at least a part of the second small electric part 62 is disposed at a position between the front surfaces 28*b* and the rear, surfaces 28*c* of the handle posts 28 in the vehicle longitudinal direction.

According to this configuration, the second small electric part 62 can be disposed compactly in a space between the front surfaces 28*b* and the rear surfaces 28*c* of the handle posts 23 between the left and right handle posts 28.

In addition, the handle post 28 includes the base section 51 and the cap section 52 for clamping the handlebar 27 between itself and the base section 51, and the handle post fastening section 71 is fastened to the cap section 52.

According to this configuration, the stay 70 can be attached to and detached from the handle posts 28 together with the cap sections 52. In this case, in a state in which the visor 49 is detached, access to the handle post fastening sections 71 is easy, ensuring good workability.

Further, the cap section 52 includes the stay support section 52*a* extending toward an inner side in the vehicle width direction relative to the handle post 28, and the handle post fastening section 71 is fastened to the stay support section 52*a*.

According to this configuration, the stay 70 can be fastened to the handle posts 28 compactly by utilizing a space on the inner side in the vehicle width direction of the handle posts 28.

Note that the above-described embodiment illustrates one mode to which the present invention is applied, and the present invention is not limited to the above embodiment.

While a structure in which the left and right handle posts 28 are provided as separate bodies has been taken as an example in the description of the above embodiment, the present invention is not limited to this. The handle posts may, for example, be left and right handle posts 28 integrally connected in the vehicle width direction, if a pair of left and right parts supporting the handlebar 27 is provided.

In addition, while the plurality of small electric parts, namely, the first small electric part 81, the second small electric part 62, and the third small electric part 63, are disposed between the left and right handle posts 28 in the above embodiment, this is not limitative, and it is sufficient that at least one small electric part is disposed between the left and right handle posts.

Besides, while the two-wheeled motor vehicle 1 has been taken as an example in the description of the above embodiment, the present invention is not limited to this, and the present invention is applicable to a three-wheeled vehicle having two front wheels or two rear wheels and saddle riding vehicles having four or more wheels.

DESCRIPTION OF REFERENCE SYMBOLS

1 Two-wheeled motor vehicle (saddle riding vehicle)
27 Handlebar
27a Central portion (that portion of a handlebar which is located between left and right handle posts)
28 Handle post
28b Front surface
28c Rear surface
44 Headlight
48 Meter (first electric part, large electric part)
49 Visor
51 Base section
52 Cap section
52a Stay support section
55 Harness
60 Electric part
61 First small electric part, (second electric part small electric part, connector)
62 Second small electric part (second electric part, small electric part, connector)
63 Third small electric part (second electric part small electric part, connector)
65a Harness
66a Harness
70 Stay
71 Handle post fastening section
72 Upper-side stay section
73 Visor support section
74 Lower extension section
75 Antenna support member
80 Turning-back section
84 Antenna

The invention claimed is:

1. A saddle riding vehicle comprising:
a steering handlebar;
a pair of left and right handle posts that supports the handlebar; and
a stay that supports an electric part,
wherein the stay is supported by the handle posts,
the electric part includes a first electric part and a second electric part,
the second electric part is disposed at least at a position between the left and right handle posts in a vehicle front view,
the stay includes a lower extension section extending downward below the first electric part,
the second electric part includes a first front electric part attached to a front surface side of the lower extension section and a second rear electric part attached to a rear surface side of the lower extension section, and
the first front electric part and the second rear electric part overlap with each other in a vehicle front view and are disposed between the left and right handle posts.

2. The saddle riding vehicle according to claim 1, wherein the stay includes a turning-back section where a part of the lower extension section turns back to a rear upper side, and
the second rear electric part is attached to the turning-back section.

3. The saddle riding vehicle according to claim 1, wherein the stay supports a visor covering the electric part from a front side, and
the visor is smaller in width than a headlight in a vehicle front view.

4. The saddle riding vehicle according to claim 1, wherein the stay includes an antenna support member that supports an antenna for radiocommunication.

5. The saddle riding vehicle according to claim 1,
wherein a visor that covers the electric part from a front side is provided,
the stay includes
a pair of left and right handle post fastening sections fastened to the left and right handle posts,
a visor support section that extends forward relative to the handle post fastening sections and that supports the visor, and
an antenna support member that supports an antenna for radiocommunication, and
the antenna support member is supported by the visor support section.

6. The saddle riding vehicle according to claim 1, wherein at least a part of the second rear electric part is disposed at a position between front surfaces and rear surfaces of the left and right handle posts in a vehicle longitudinal direction.

7. A saddle riding vehicle comprising:
a steering handlebar;
a pair of left and right handle posts that supports the handlebar; and
a stay that supports an electric part,
wherein the stay is supported by the handle posts,
the electric part includes a first electric part and a second electric part,
the second electric part is disposed at least at a position between the left and right handle posts in a vehicle front view,
wherein the first electric part is a meter, while the second electric part is a connector for harnesses, and
the meter and the connector are disposed such as to surround that portion of the handlebar which is located between the left and right handle posts.

8. A saddle riding vehicle comprising:
a steering handlebar;
a pair of left and right handle posts that supports the handlebar; and
a stay that supports an electric part,
wherein the stay is supported by the handle posts,
the electric part includes a first electric part and a second electric part,
the second electric part is disposed at least at a position between the left and right handle posts in a vehicle front view,
wherein a visor that covers the electric part from a front side is provided, and
the stay includes
a pair of left and right handle post fastening sections fastened to the left and right handle posts,
an upper-side stay section that extends rearward on an upper side of the handlebar from the handle post fastening sections and that supports the first electric part,
a visor support section that extends forward relative to the upper-side stay section and that supports the visor, and
a lower extension section that extends downward relative to the upper-side stay section, that is located on a front side of the handlebar, and that supports the second electric part.

9. The saddle riding vehicle according to claim 8,
wherein each of the handle posts includes a base section, and a cap section that clamps the handlebar between the cap section and the base section, and corresponding one of the handle post fastening sections is fastened to the cap section.

10. The saddle riding vehicle according to claim 9, wherein the cap section includes a stay support section extending toward an inner side in a vehicle width direction relative to the handle post, and the handle post fastening section is fastened to the stay support section.

* * * * *